(12) United States Patent
Yamawaki

(10) Patent No.: US 12,731,828 B2
(45) Date of Patent: Sep. 8, 2026

(54) BATTERY CASE AND SECONDARY BATTERY INCLUDING THE SAME

(71) Applicant: Prime Planet Energy & Solutions, Inc., Tokyo (JP)

(72) Inventor: Takuya Yamawaki, Takasago (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 703 days.

(21) Appl. No.: 18/183,169

(22) Filed: Mar. 14, 2023

(65) Prior Publication Data

US 2023/0299392 A1 Sep. 21, 2023

(30) Foreign Application Priority Data

Mar. 18, 2022 (JP) ................................ 2022-043909

(51) Int. Cl.
*H01M 50/103* (2021.01)
*H01M 50/15* (2021.01)

(52) U.S. Cl.
CPC ......... *H01M 50/103* (2021.01); *H01M 50/15* (2021.01)

(58) Field of Classification Search
CPC .. H01M 50/103; H01M 50/15; H01M 50/169; Y02E 60/10
See application file for complete search history.

(56) References Cited

U.S. PATENT DOCUMENTS

2015/0318517 A1 11/2015 Suzuki et al.
2016/0049623 A1* 2/2016 Lee .................... H01M 50/169 429/185
2019/0081288 A1 3/2019 Oide et al.

FOREIGN PATENT DOCUMENTS

| | | | |
|---|---|---|---|
| JP | 2001135282 A | | 5/2001 |
| JP | 2013093119 A | * | 5/2013 |
| JP | 2014-010936 A | | 1/2014 |
| JP | 2016-042464 A | | 3/2016 |
| JP | 2018-022586 A | | 2/2018 |
| JP | 6879213 B2 | | 6/2021 |
| WO | 2017082317 A1 | | 5/2017 |

OTHER PUBLICATIONS

JP-2013093119-A Translation (Year: 2013).*

* cited by examiner

*Primary Examiner* — Matthew T Martin
*Assistant Examiner* — Kevin Song
(74) *Attorney, Agent, or Firm* — HAUPTMAN HAM, LLP

(57) ABSTRACT

Provided is a technique to prevent formation of a gap between a case body and a sealing plate. The battery case disclosed herein includes: a case body having an opening; and a substantially rectangular sealing plate attached to the opening. The sealing plate has a pair of long side portions, a pair of short side portions, and R portions at four corners. An edge of a lower surface of the sealing plate is chamfered. A chamfering amount of the short side portions is greater than a chamfering amount of the long side portions. Each the R portions comprises a gradual change region, where a chamfering amount gradually decreases from a first end on a side of the short side portions toward a second end on a side of the long side portions.

9 Claims, 10 Drawing Sheets

BATTERY CASE AND SECONDARY BATTERY INCLUDING THE SAME

CROSS REFERENCE TO RELATED APPLICATIONS

The present application is based upon and claims the benefit of priority from Japanese patent application No. 2022-043909 filed on Mar. 18, 2022, and the entire disclosure of which is incorporated herein in its entirety by reference.

BACKGROUND OF THE DISCLOSURE

1. Technical Field

The present disclosure relates to a battery case and a secondary battery including the same.

2. Background

Japanese Patent Application Publication No. 2001-135282 discloses a sealed battery in which a lid provided over the opening in an upper portion of a battery can is sealed by welding. This publication proposes that four corner steps are provided on the four curved corners of the inner surface of the opening in the upper portion of the battery can, and long side steps are formed on the inner surfaces of at least the long sides of the opening, and the battery lid is fitted and welded to the long side steps. In the technology proposed in the publication, steps are additionally provided in the long sides in addition to the four corner steps in the battery can, so that the battery lid can be reliably fitted and welded to a desired position.

WO 2017/082317 discloses a power storage device including a bottomed cylindrical metal case body having an opening and a metal lid closing the opening. The lid of the power storage device includes a lid body, an insertion portion, and a corner portion. The lid body is a portion which closes the opening and is supported by an opening end surface of the case body surrounding the opening. The insertion portion is a columnar portion protruding from the lid body toward the inside of the case body and extending along the inner peripheral surface of the case body. The corner portion is a rounded or chamfered portion at the leading edge of the insertion portion in the inserting direction. The publication proposes that the lower limit of the chamfer in the corner portion is set to the average particle diameter of the material of the lid. In the publication, with such a configuration, when the insertion portion is inserted into the case body during the process of manufacturing the case, the tip edge of the insertion portion is substantially prevented from being cut by the inner peripheral surface of the case body, and generation of thread-like foreign matter is substantially prevented.

SUMMARY OF THE INVENTION

Formation of a gap between a case body and a sealing plate with the sealing plate attached to the opening of the case body is desirably reduced.

The battery case disclosed herein includes: a case body in bottomed rectangular parallelopiped shape having an opening in one side surface facing its bottom surface; and a substantially rectangular sealing plate attached to the opening and having a shape corresponding to an upper edge of the opening. The opening of the case body has steps protruding inward on inner surfaces of a pair of short sides facing each other. The sealing plate is a plate fitted into the opening, and has a pair of long side portions facing each other, a pair of short side portions located at both ends of the pair of long side portions and facing each other, and R portions provided at four corners between the long side portions and the short side portions. An edge of a lower surface of the sealing plate is chamfered. A chamfering amount of the pair of short side portions is greater than a chamfering amount of the pair of long side portions, and the R portions are each provided with a gradual change region where a chamfering amount gradually decreases from a first end on a side of the short side portions toward a second end on a side of the long side portions.

In the battery case with such a configuration, when the sealing plate is attached to the opening, the chamfering amount of the long side portions of the sealing plate is made smaller to improve fitting to the long sides of the opening. Further, each the R portions are provided with a gradual change region, so that the chamfering amount of the short side portions gradually approaches the chamfering amount of the long side portions. This makes it difficult for a gap to be formed between the case body and the sealing plate in the battery case disclosed herein.

The gradual change region may be provided in a range from 45° or more and less than 90° from a center of each of the R portions, starting from a boundary between each of the R portions and each of the short side portions.

The R portions may each include a first region adjacent to one of the short side portions and a second region adjacent to one of the long side portions. In this case, the gradual change region may be provided between the first region and the second region. A chamfering amount of the first region may be equal to the chamfering amount of the short side potions. A chamfering amount of the second region may be equal to the chamfering amount of the long side portions.

A secondary battery disclosed herein may include the battery case.

DETAILED DESCRIPTION OF THE PREFERRED EMBODIMENTS

Figure 1:
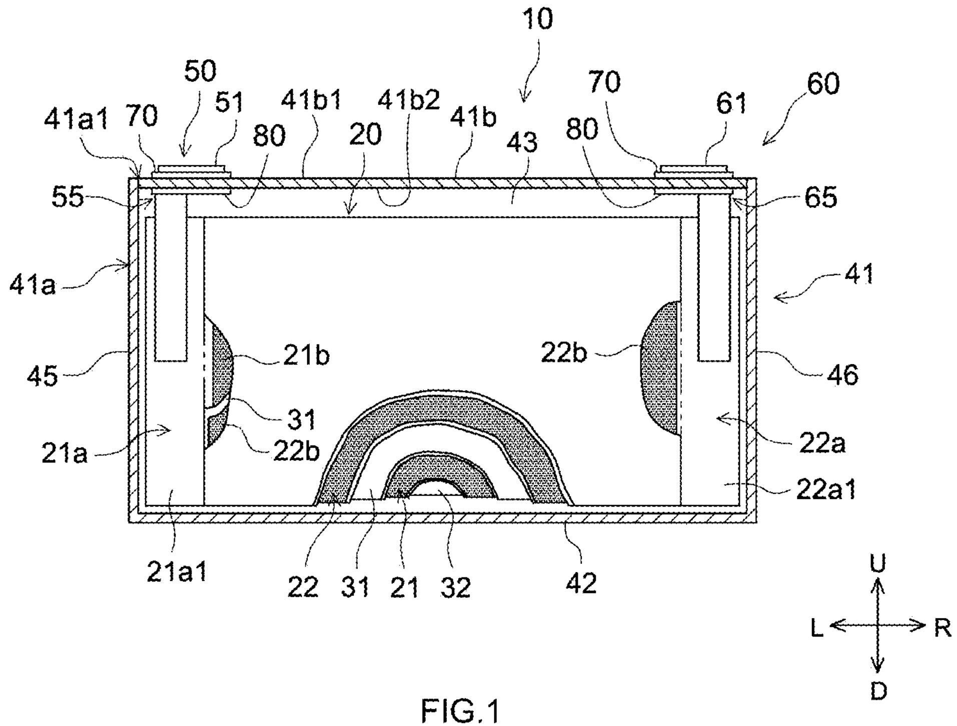
FIG. 1 is a partial sectional view of a secondary battery 10.

The following describes embodiments of the present disclosure. The embodiments described herein are naturally not intended to limit the present disclosure. Each drawing has been schematically illustrated and therefore may not necessarily reflect actual elements. The expression "A to B" indicating a numerical range means "A or more and B or less," and also means "above A and below B" unless otherwise specified. In the drawings described below, the same members/portions which exhibit the same action are denoted by the same reference numerals, and the duplicated descriptions may be omitted or simplified.

The "secondary battery" herein generally refers to an electricity storage device which causes a charging and discharging reaction by movement of charge carriers between a pair of electrodes (a positive electrode and a negative electrode) via an electrolyte. The "secondary battery" herein encompasses so-called secondary batteries such as a lithium-ion secondary battery, a nickel hydride battery and a nickel cadmium battery, and capacitors such as an electric double-layer capacitor The following describes the embodiments of the battery case and the secondary battery including the same disclosed herein, using a lithium-ion secondary battery as an example among secondary batteries. The disclosure herein is not limited to the lithium-ion secondary battery and can be applied to other secondary batteries, unless otherwise mentioned.

First Embodiment

Secondary Battery 10

FIG. 1 is a partial sectional view of a secondary battery 10. FIG. 1 shows the state where the inside of the lithium-ion secondary battery 10 is exposed along one wider surface of a substantially cuboid battery case 41. The secondary battery 10 shown in FIG. 1 is a so-called sealed battery where a battery case 41 housing an electrode body 20 is sealed. Up, down, left, right, front, and rear directions are represented by the U, D, L, R, F, and Rr arrows, respectively, in the drawings. Herein, a wide surface portion 44 (see FIGS. 1 and 2) facing a wide surface portion 43 of the secondary battery 10 is defined as "front (F)" (front surface), and the wide surface portion 43 is defined as "rear (Rr)," the sealing plate 41*b* side is defined as "upper (U)," the bottom portion 42 side is defined as "lower (D)," the narrow surfaces portion 45 side is defined as "left (L)," and the narrow surface portion 46 side is defined as "right (R)."

As shown in FIG. 1, the secondary battery 10 includes the electrode body 20 and the battery case 41. The battery case 41 includes a case body 41*a* having an opening 41*a*1 and a sealing plate 41*b* blocking the opening 41*a*1 of the case body 41*a*. The case body 41*a* houses the electrode body 20. Inner terminals 55 and 65 and external terminals 51 and 61 are attached to the sealing plate 41*b* via gaskets 70 and insulators 80. In the embodiment, the inner terminal 55 is connected to a positive electrode current collector foil 21*a* of the electrode body 20. The external terminal 51 is connected to the inner terminal 55 and constitutes a positive electrode terminal 50 outside the battery case 41. The inner terminal 65 is connected to a negative electrode current collector foil 22*a* of the electrode body 20. The external terminal 61 is connected to the inner terminal 65, and constitutes a negative electrode terminal 60 outside the battery case 41.

Electrode Body 20

The electrode body 20 is housed in the battery case 41 with being covered with an insulation film (not shown) or the like. The electrode body 20 includes a positive electrode sheet 21 as a positive electrode member, a negative electrode sheet 22 as a negative electrode member, and separator sheets 31 and 32 as a separator. The positive electrode sheet 21, the first separator sheet 31, a negative electrode sheet 22, and a second separator sheet 32 are each a long strip-like member.

In the positive electrode sheet 21, positive electrode active material layers 21*b* are formed on both surfaces of a positive electrode current collector foil 21*a* (e.g., an aluminum foil) having a predetermined width and a predetermined thickness except for a portion 21*a*1 which is set to have a certain width at one end in the width direction. For lithium-ion secondary batteries, the positive electrode active material is, for example, a material that can release lithium ions during charging and absorb lithium ions during discharging, such as a lithium transition metal composite. For the positive electrode active material, various kinds besides the lithium transition metal composite material are generally proposed without particular limitations.

In the negative electrode sheet 22, negative electrode active material layers 22*b* containing a negative electrode active material are formed on both surfaces of a negative electrode current collector foil 22*a* (here, a copper foil) having a predetermined width and a predetermined thickness except for a portion 22*a*1 which is set to have a certain width at one end in the width direction. For lithium-ion secondary batteries, the negative electrode active material is, for example, a material that absorbs lithium ions during charging and releases the absorbed lithium ions during discharging, such as natural graphite. For the negative electrode active material, various kinds besides the natural graphite are generally proposed without particular limitations.

The separator sheets 31 and 32 used may each be porous resin sheets through which an electrolyte with a desired heat resistance can pass. For the separator sheets 31 and 32, various kinds are proposed without particular limitations.

The negative electrode active material layer 22*b* is formed to have a width greater than the width of the positive electrode active material layer 21*b*, for example. The widths of the separator sheets 31 and 32 are greater than that of the negative electrode active material layer 22*b*. The portion 21*a*1 where the positive electrode active material layer 21*b* is not formed and the portion 22*a*1 where the negative electrode active material layer 22*b* is not formed are disposed to face each other in the width direction. The positive electrode sheet 21, the first separator sheet 31, a negative electrode sheet 22, and a second separator sheet 32 are aligned in the length direction, and are wound up in turn on top of each other. The negative electrode active material layer 22*b* covers the positive electrode active material layer 21*b* with the separator sheets 31 and 32 interposed therebetween. The negative electrode active material layer 22*b* is covered with the separator sheets 31 and 32. The portion 21*a*1 protrudes from one side of the separator sheets 31 and 32 in the width direction. The portion 22*a*1 protrudes from the separator sheets 31 and 32 on the other side in the width direction.

As shown in FIG. 1, the above-mentioned electrode body 20 is flat along one plane including the winding axis so as to be housed in the case body 41*a* of the battery case 41. The portion 21*a*1 is disposed on one side, and the portion 22*a*1 is disposed on the other side, of the electrode body 20 along the winding axis.

Battery Case 41

The battery case 41 houses the electrode body 20. The battery case 41 includes a case body 41*a* and a sealing plate

41*b*. The case body 41*a* is a bottomed member with an opening 41*a*1 on one side opposite to the bottom surface. In the present embodiment, the case body 41*a* has an opening in one side surface and a substantially cuboid square shape. The sealing plate 41*b* is a plate material which is attached to the opening 41*a*1 of the case body 41*a*. In this embodiment, the case body 41*a* and the sealing plate 41*b* are formed of aluminum or an aluminum alloy mainly containing aluminum in order to reduce weight and ensure the required rigidity. In the embodiment shown in FIG. 1, a wound electrode body 20 is shown as an example, but the structure of the electrode body 20 is not limited thereto. The structure of the electrode body 20 may have, for example, a lamination structure in which the positive electrode sheet and the negative electrode sheet are stacked alternately with separators interposed therebetween. The battery case 41 may house a plurality of electrode bodies 20.

The battery case 41 may house an electrolyte (not shown) together with the electrode body 20. The electrolyte used may be a nonaqueous electrolyte obtained by dissolving a supporting electrolyte in a nonaqueous solvent. Examples of the nonaqueous solvent include carbonate-based solvents such as ethylene carbonate, dimethyl carbonate, and ethyl methyl carbonate. Examples of the supporting electrolyte include fluorine-containing lithium salts such as $LiPF_6$.

Case Body 41*a*

Figure 2:
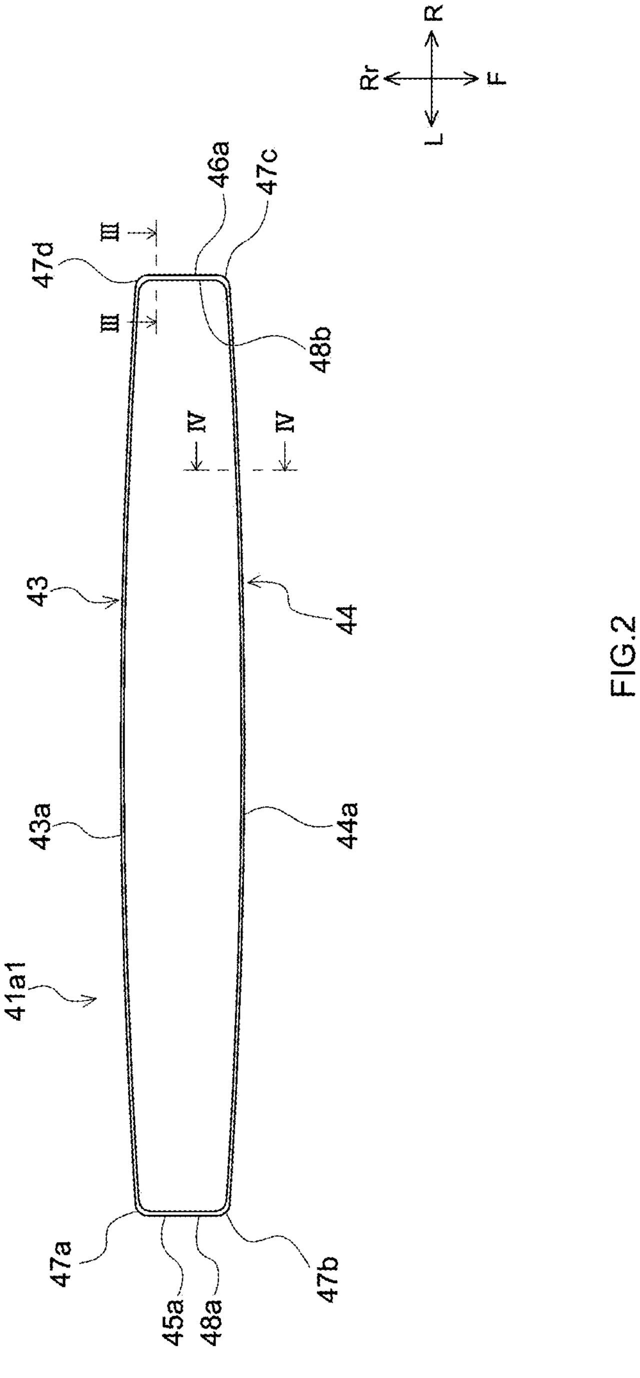
FIG. 2 is a plan view of a case body 41*a*.

FIG. 2 is a plan view of a case body 41*a*. The case body 41*a* is a member in bottomed rectangular parallelopiped shape with an opening 41*a*1 on one side opposite to the bottom surface. In the present embodiment, the case body 41*a* has an opening in one side surface and a substantially cuboid square shape. As shown in FIGS. 1 and 2, the case body 41*a* has a bottom portion 42 forming a substantially rectangular bottom surface, a pair of wide surface portions 43 and 44, and a pair of narrow surface portions 45 and 46. The wide surface portions 43 and 44 in pair are each standing from the long side of the bottom portion 42. The narrow surface portions 45 and 46 in pair are each standing from the short side of the bottom portion 42. In one side surface of the case body 41*a*, an opening 41*a*1 surrounded by the pair of wide surface portions 43 and 44 and the pair of narrow surface portions 45 and 46 is formed. As shown in FIG. 2, the opening 41*a*1 of the case body 41*a* is a substantially rectangular opening having curved portions 47*a* to 47*d* each having an arc shape.

As shown in FIG. 2, the opening 41*a*1 of the case body 41*a* has a pair of long sides 43*a* and 44*a* facing each other, a pair of short sides 45*a* and 46*a* facing each other, and four curved portions 47*a* to 47*d*. The long sides 43*a* and 44*a* are upper edges of the wide surface portions 43 and 44. The short sides 45*a* and 46*a* are upper edges of the narrow surface portions 45 and 46. The short sides 45*a* and 46*a* are located at both ends of the pair of long sides 43*a* and 44*a*. The curved portions 47*a* to 47*d* are upper edges of outwardly bulging curved surfaces connecting the wide surface portions 43 and 44 and the narrow surface portions 45 and 46. The curved portions 47*a* to 47*d* are provided at the four corners of the opening 41*a*1 of the case body 41*a*, along the curved lines connecting the long sides and the short sides. In the embodiment, the opening 41*a*1 of the case body 41*a* is molded so that the long sides 43*a* and 44*a* of the opening 41*a*1 bulge slightly outward before the sealing plate 41*b* is attached.

When the sealing plate 41*b* is attached to the opening 41*a*1, short side portions 93 and 94 (see FIGS. 9 and 10) of the sealing plate 41*b* are placed on steps 48*a* and 48*b* of the opening 41*a*1. As a result, the opening 41*a*1 of the case body 41*a* is closed by the sealing plate 41*b*. In this state, the opening 41*a*1 of the case body 41*a* is clamped by the long sides 43*a* and 44*a*. As a result, this holds the sealing plate 41*b* between the long sides 43*a* and 44*a* of the opening 41*a*1 of the case body 41*a*. The sealing plate 41*b* and the case body 41*a* are welded together by laser irradiation and scanning in the circumferential direction at the boundary site between the sealing plate 41*b* and the case body 41*a*. As a result, the opening 41*a*1 of the case body 41*a* is sealed by the sealing plate 41*b*.

Figure 3:
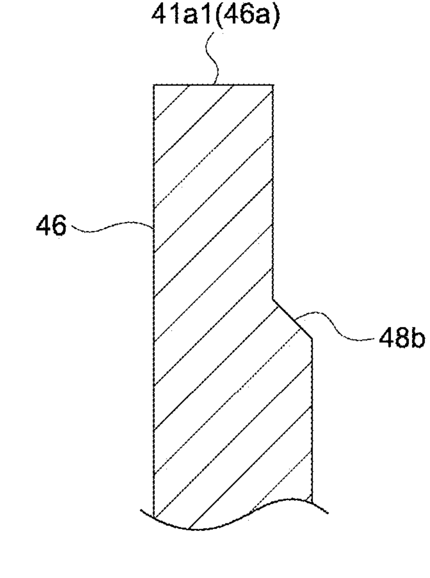
FIG. 3 is a sectional view taken along line III-III of FIG. 2.
Figure 3:

FIG. 3 is a sectional view taken along line III-III of FIG. 2. As shown in FIGS. 2 and 3, the opening 41*a*1 of the case body 41*a* has steps 48*a* and 48*b* on the inner surfaces of the short sides 45*a* and 46*a* in pair facing each other. The steps 48*a* and 48*b* are portions that support the sealing plate 41*b* attached to the opening 41*a*1 of the case body 41*a*. The steps 48*a* and 48*b* are located at predetermined positions from the upper edges of the short sides 45*a* and 46*a*. In this embodiment, the positions of the steps 48*a* and 48*b* on the inner surfaces of the short sides 45*a* and 46*a* are defined such that the height of the upper edge of the opening 41*a*1 of the case body 41*a* and the height of the upper surface of the sealing plate 41*b* match when the sealing plate 41*b* is attached to the opening 41*a*1 of the case body 41*a*. Specifically, the steps 48*a* and 48*b* are provided at a height corresponding to the thickness of the sealing plate 41*b* from the upper edges of the short sides 45*a* and 46*a*. In this embodiment, the short sides 45*a* and 46*a* of the case body 41*a* have a thickness below the steps 48*a* and 48*b* that is higher than a thickness at the upper edge. When viewed from the upper edges of the short sides 45*a* and 46*a* of the case body 41*a*, the steps 48*a* and 48*b* protrude inward of the case from the upper edge of the case body 41*a*. In the embodiment shown in FIG. 3, the steps 48*a* and 48*b* each have a tapered surface inclined inward toward the bottom portion 42. The taper angle may be 40° to 55°. The steps 48*a* and 48*b* of the short sides 45*a* and 46*a* are continuous to part of the curved portions 47*a* to 47*d*. In this embodiment, the edge of a lower surface 41*b*2 of the sealing plate 41*b* is chamfered, and the tapered surfaces of the steps 48*a* and 48*b* of the short sides 45*a* and 46*a* are set, as appropriate, according to the angle of the chamfer.

Figure 4:
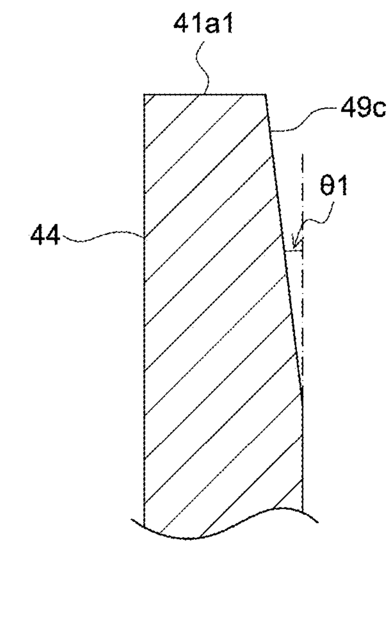
FIG. 4 is a sectional view taken along line IV-IV of FIG. 2.
Figure 4:

FIG. 4 is a sectional view taken along line IV-IV of FIG. 2. In the form shown in FIGS. 2 and 4, the inner surfaces of the long sides 43*a* and 44*a* in pair facing each other are provided with tapered surfaces 49*c* inclined inward toward their lower portions. The angle of each of the tapered surfaces 49*c* may be set such that when the sealing plate 41*b* is attached to the opening 41*a*1 of the case body 41*a*, it is pushed with light force, i.e., lightly press-fitted. In this embodiment, the tapered surface 49*c* is inclined at an angle $\theta 1$ from the upper edge of each of the long sides 43*a*, 44*a* with respect to the direction orthogonal to the opening 41*a*1 of the case body 41*a*. The angle $\theta 1$ may be 5° to 20° (e.g., about 15°).

Figure 5:
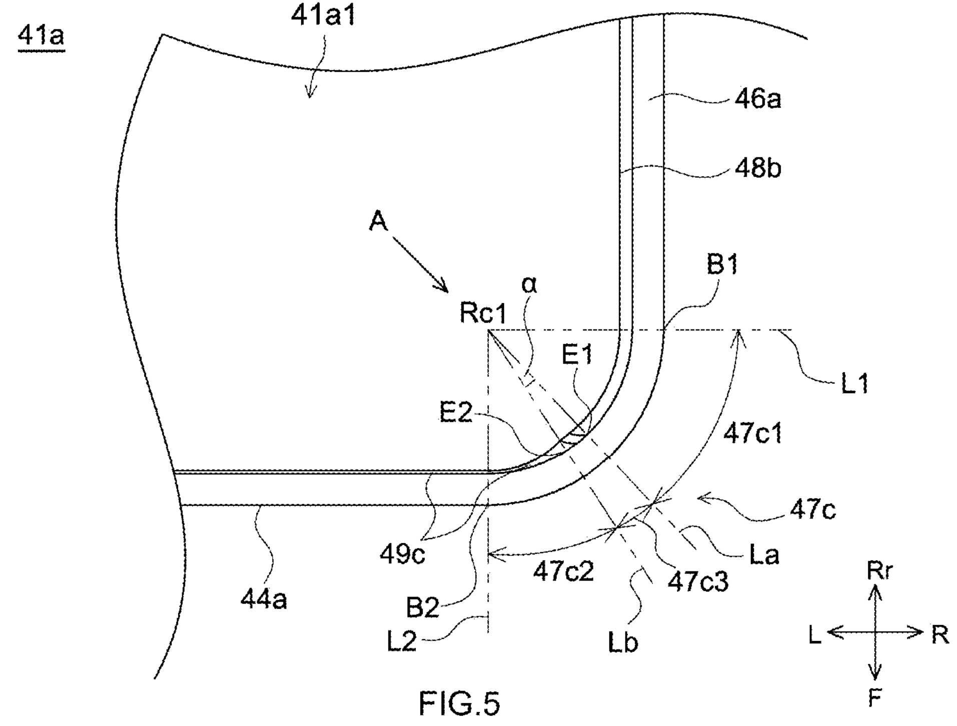
FIG. 5 is a partially enlarged view of FIG. 2.

FIG. 5 is a partially enlarged view of FIG. 2. FIG. 5 shows a partially enlarged curved portion 47*c* of FIG. 2. As shown in FIG. 5, the curved portion 47*c* is provided with a gradual change section 47*c*3 where the shape of the step 48*b* changes to be gradually close to the shape of the inner surface of the long side 44*a* toward the long side 44*a* along the curved portion 47*c*. The curved portions 47*a*, 47*b*, and 47*d* have the same configuration as the curved portion 47*c*; thus, illustration and description thereof may be omitted.

The gradual change section 47c3 may be superimposed on a gradual change region (described later) of the sealing plate 41b. In this embodiment, the gradual change portion 47c3 is provided in the range from 45° to 90° from the center Rc1 of the curved portion 47c, starting from the boundary B1 between the curved portion 47c and the short side 46a. As shown in FIG. 5, when the straight line L1 connecting the center Rc1 and the boundary B1 is set as a reference (0°), the gradual change section 47c3 may be located in the range from 45° or more and less than 90° (e.g., 50° to 70°) from the straight line L1 with the center Rc1 as the center. In FIG. 5, the gradual change section 47c3 is a portion sandwiched between straight lines La and Lb. Although not particularly limited thereto, the angle $\alpha$ formed between the straight lines La and Lb may be set to, for example, 3° to 10°.

In the form shown in FIG. 5, the curved portion 47c has a first section 47c1, a second section 47c2, and a gradual change section 47c3. The first section 47c1 is adjacent to the short side 46a. In FIG. 5, the first section 47c1 is a section sandwiched between straight lines L1 and La. In this embodiment, the first section 47c1 overlaps a first region (described later) of the sealing plate 41b. The second section 47c2 is adjacent to the long side 44a. In FIG. 5, the second section 47c2 is a section sandwiched between straight lines Lb and L2. In this embodiment, the second section 47c2 overlaps a second region (described later) of the sealing plate 41b. The straight line L2 is a straight line L2 connecting the center Rc1 and a boundary B2 between the curved portion 47c and the long side 44a.

As shown in FIG. 5, the first section 47c1 is provided with the step 48b. The step 48b is provided from the short side 46a to the first section 47c1. As shown in FIG. 5, the second section 47c2 is provided with the tapered surface 49c. In this embodiment, the tapered surface 49c is provided from the second section 47c2 to the long side 44a. In the form shown in FIG. 5, the gradual change section 47c3 is provided between the first section 47c1 and the second section 47c2. In the gradual change section 47c3, the shape of the step 48b in the first section 47c1 may be configured to change so as to be gradually close to the tapered surface 49c from the second section 47c2 and the long side 44a along the curved portion 47c.

Figure 6:
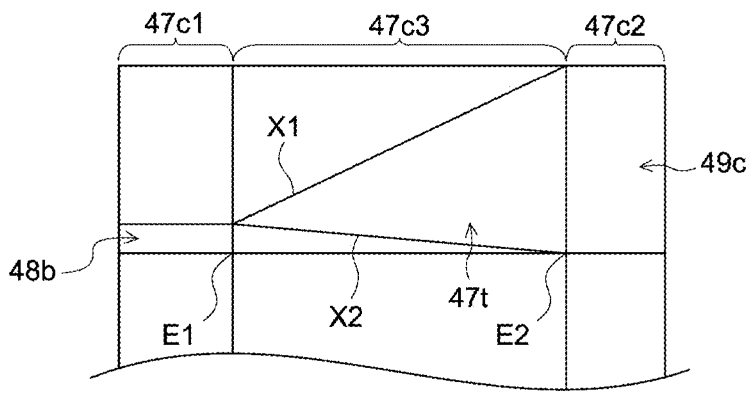
FIG. 6 is a view seen from the arrow A in FIG. 5.
Figure 7:
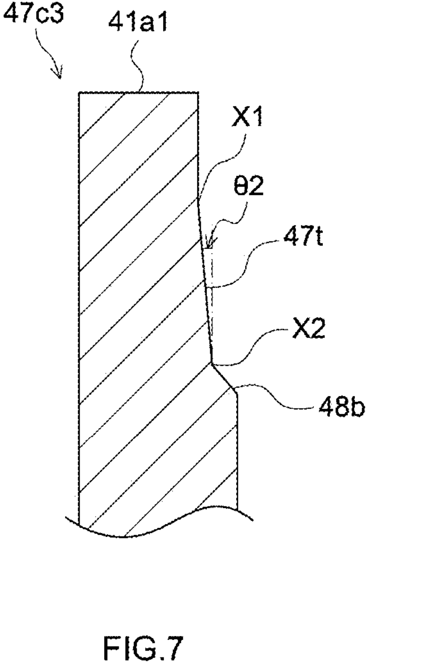
FIG. 7 is a sectional view of a gradual change section 47*c*3.
Figure 8:
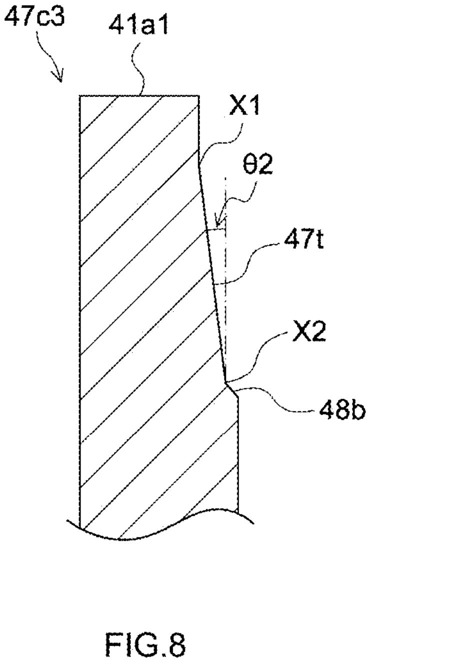
FIG. 8 is a sectional view of another gradual change section 47*c*3.

FIG. 6 is a view seen from the arrow A in FIG. 5. FIGS. 7 and 8 are sectional views of the gradual change section 47c3. The gradual change section 47c3 is a region where the shape of the inner surface changes. Thus, the sectional shape of the gradual change section 47c3 is not defined. FIG. 6 is a view of the curved portion 47c seen from the inside of the case body 41a. FIGS. 6 to 8 show the process of changing the shape of the inner surface from the step 48b of the first section 47c1 toward the tapered surface 49c of the second section 47c2 in the gradual change section 47c3.

In this embodiment, the gradual change section 47c3 has two tapered surfaces. For example, the shape of the two tapered surfaces 49c gradually change from the first section 47c1 toward the second section 47c2, so that the step 48b and the tapered surfaces 49c are continuous. In this embodiment, the two tapered surfaces 47t include the tapered surface of the step 48b and the tapered surface 47t. The shape of the tapered surface 47t changes from the endpoint E1 of the first section 47c1 toward the starting point E2 of the second section 47c2, for example. As shown in FIGS. 7 and 8, the tapered surface 47t is inclined inward toward its lower portion. As shown in FIG. 6, the tapered surface 47t gradually increases in size from the endpoint E1 of the first section 47c1 toward the starting point E2 of the second section 47c2, becoming a tapered surface 49c at the starting point E2. Further, the tapered surface of the step 48b gradually decreases in size from the endpoint E1 toward the starting point E2, and is absorbed by the tapered surface 49c at the starting point E2.

As shown in FIGS. 6 to 8, an upper end X1 of the tapered surface 47t is provided between the step 48b and the upper edge of the opening 41a1. As shown in FIGS. 3 to 8, from the endpoint E1 to the starting point E2, the upper end X1 is provided from the upper end of the step 48b at the endpoint E1 gradually toward the opening 41a1, and reaches the upper edge of the opening 41a1 at the starting point E2. As shown in FIGS. 3 to 7, from the endpoint E1 toward the starting point E2, a lower end X2 of the tapered surface 47t is provided from the upper end of the step 48b at the endpoint E1 gradually toward the bottom portion 42 (see FIG. 1), and reaches the lower end of the tapered surface 49c at the starting point E2.

Further, in this embodiment, the tapered surface 47t is inclined at an angle $\theta 2$ with respect to the direction orthogonal to the opening 41a1. The angle $\theta 2$ may be, for example, 5° to 30°. In the gradual change section 47c3, for example, the angle $\theta 2$ gradually changes from the endpoint E1 toward the starting point E2 in the range from 5° to 30°, so that the step 48b and the tapered surface 49c are continuous.

Sealing Plate 41b

Figure 9:
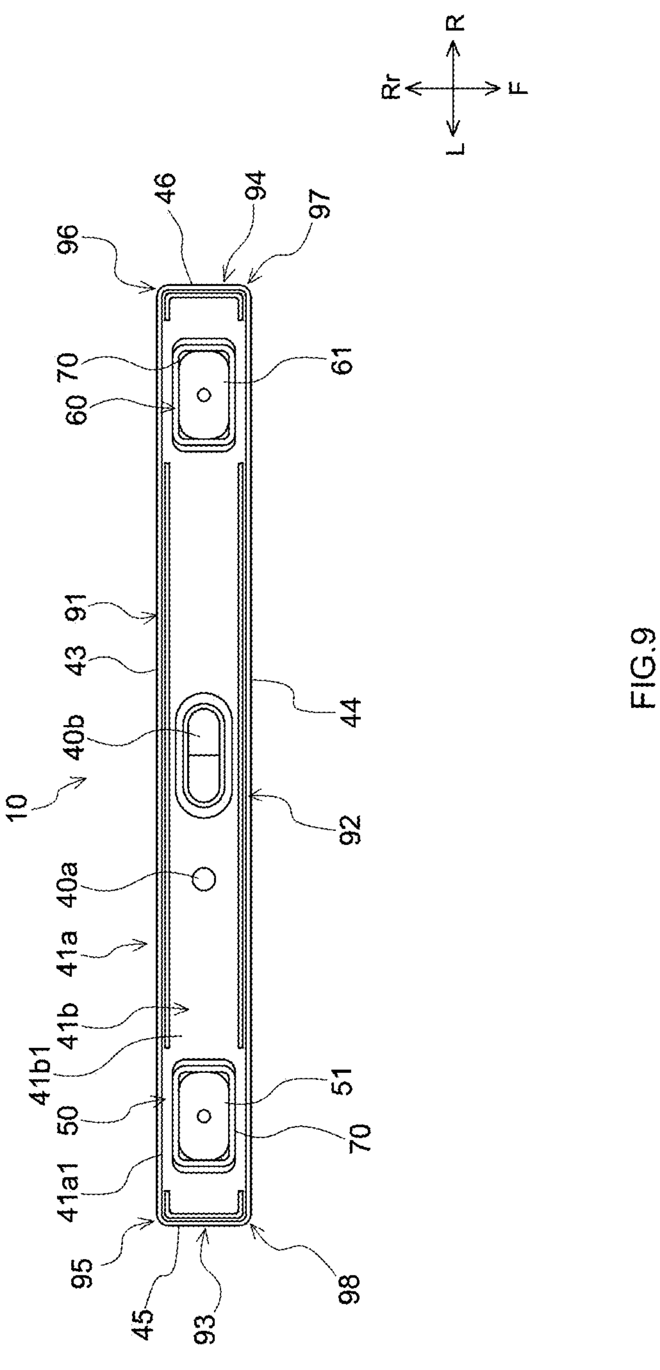
FIG. 9 is a plan view of the secondary battery 10 with a sealing plate 41*b* attached.

FIG. 9 is a plan view of the secondary battery 10 with a sealing plate 41b attached. As shown in FIGS. 1 and 9, the sealing plate 41b is a substantially rectangular plate member attached to the opening 41a1 of the case body 41a and having a shape corresponding to an upper edge of the opening 41a1. In this embodiment, the sealing plate 41b is attached to the inner side of the opening 41a1 along the inner surface of the opening 41a1 of the case body 41a.

In this embodiment, the sealing plate 41b is provided with a liquid injection hole 40a and a safety valve 40b. A sealing member is attached to the liquid injection hole 40a after the sealing plate 41b is attached to the opening 41a1 of the case body 41a and an electrolyte is injected into the case body 41a. FIG. 9 shows the state where the sealing plate 41b is assembled and welded to the opening 41a1 of the case body 41a. In FIG. 9, the sealing member is not attached to the sealing plate 41b. The safety valve 40b is a thin portion which breaks when the pressure inside the battery case 41 reaches a pressure larger than a predetermined pressure.

A positive electrode terminal 50 and a negative electrode terminal 60 are attached to an upper surface 41b1 of the sealing plate 41b. The sealing plate 41b includes terminal attachment holes 5 and 6 to which a positive electrode terminal 50 and a negative electrode terminal 60 are attached (see FIG. 10). As shown in FIGS. 1 and 9, the positive electrode terminal 50 includes an external terminal 51 and an inner terminal 55. The negative electrode terminal 60 includes an external terminal 61 and an inner terminal 65. The inner terminals 55 and 65 are attached to the inner side of the sealing plate 41b via an insulator 80. The external terminals 51 and 61 are attached to the outer side of the sealing plate 41b via a gasket 70. The inner terminals 55 and 65 extend into the case body 41a. A portion 21a1 of the positive electrode current collector foil 21a in the electrode body 20 and a portion 22a1 of the negative electrode current collector foil 22a in the electrode body 20 are attached respectively to the inner terminals 55 and 65 attached to both sides of sealing plate 41b in the longitudinal direction.

The sealing plate 41b is a rectangular plate fitted to the opening 41a1 of the case body 41a. As shown in FIG. 9, the sealing plate 41*b* includes a pair of long side portions 91 and 92, a pair of short side portions 93 and 94, and R portions 95 to 98 provided at four corners. The long side portions 91 and 92 in pair face each other. The short side portions 93 and 94 in pair are located at both ends of the long side portions 91 and 92 in pair and face each other. The R portions 95 to 98 are provided at four corners between the long side portions 91 and 92 and the short side portions 93 and 94. As shown in FIG. 9, the R portions 95 to 98 are provided between the long side portions 91 and 92 and the short side portions 93 and 94, and are curved to bulge outward of the sealing plate 41*b*.

As shown in FIGS. 1 and 9, when the sealing plate 41*b* is attached to the case body 41*a*, the upper surface 41*b*1 of the sealing plate 41*b* is positioned to face outside of the secondary battery 10. As shown in FIG. 1, the lower surface 41*b*2 of the sealing plate 41*b* is positioned to face inside of the secondary battery 10. The upper surface 41*b*1 is, for example, a surface which faces outside of the case body 41*a* when attached to the opening 41*a*1 of the case body 41*a*. The lower surface 41*b*2 is, for example a surface which faces inside of the case body 41*a* when attached to the opening 41*a*1 of the case body 41*a*.

Figure 10:
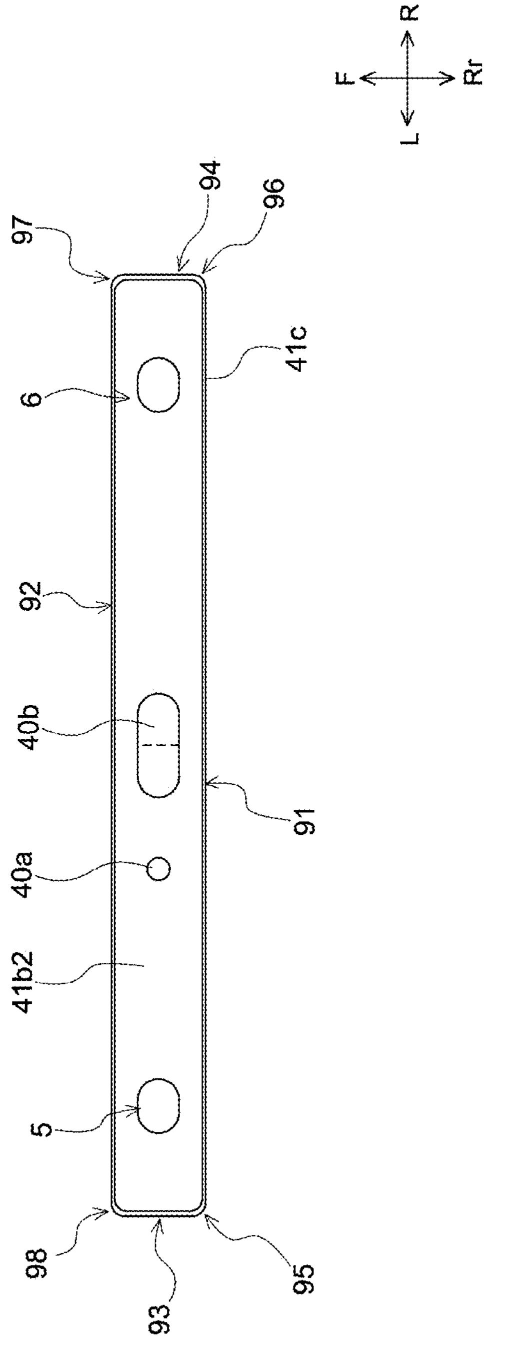
FIG. 10 is a back surface view of the sealing plate 41*b*.
Figure 11:
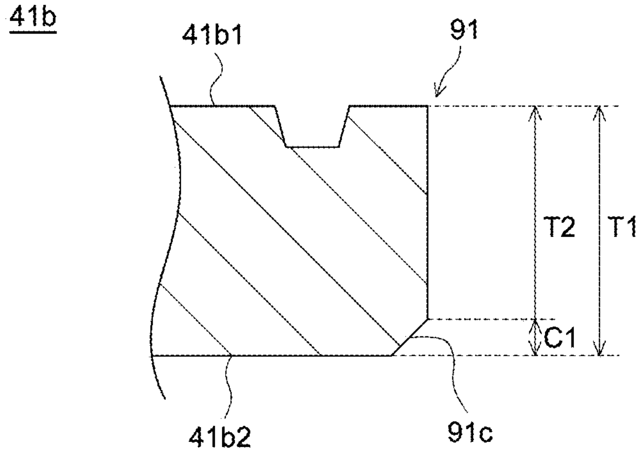
FIG. 11 is a sectional view of a long side portion 91.
Figure 12:
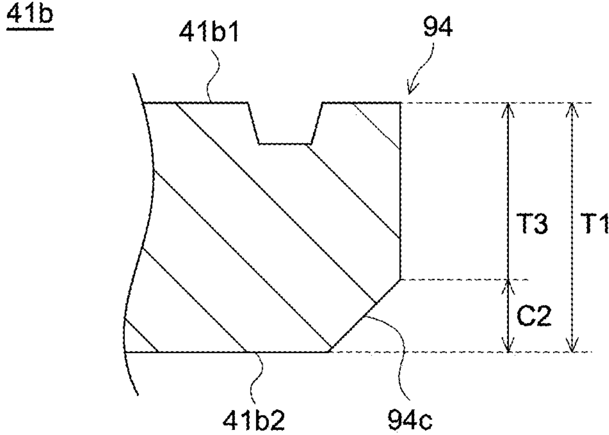
FIG. 12 is a sectional view of a short side portion 94.

FIG. 10 is a back surface view of the sealing plate 41*b*. FIG. 11 is a sectional view of a long side portion 91. FIG. 12 is a sectional view of a short side portion 94. As shown in FIG. 10, the edge of the lower surface 41*b*2 of the sealing plate 41*b* comprises a chamfered portion 41*c*. In this embodiment, the chamfered portion 41*c* has a first chamfered portion 91*c* provided in the long side portions 91 and 92, and a second chamfered portion 94*c* provided in the short side portions 93 and 94. As shown in FIG. 11, the first chamfered portion 91*c* is provided in the long side portion 91. As shown in FIG. 12, the second chamfered portion 94*c* is provided in the short side portion 94. In this embodiment, both the first chamfered portion 91*c* and the second chamfered portion 94*c* are formed.

As shown in FIGS. 11 and 12, a chamfering amount C2 of the short side portions 93 and 94 in pair is larger than a chamfering amount C1 of the long side portions 91 and 92 in pair. Herein, "the chamfering amount C1 of the long side portions 91 and 92" refers to a value obtained by subtracting the thickness T2 of the sealing plate 41*b* at the edges of the long side portions 91 and 92 from the thickness T1 of the sealing plate 41*b* (the chamfering amount C1=the thickness T1−the thickness T2 (see FIG. 11). The thickness T1 may be defined by the shortest distance from the upper surface 41*b*1 to the lower surface 41*b*2, for example. Thickness T2 is the thickness of the sealing plate 41*b* at the edge of the long side portion 91 in FIG. 11. Herein, "the chamfering amount C2 of short side portions 93 and 94" refers to a value obtained by subtracting the thickness T3 of the sealing plate 41*b* at the edges of short side portions 93 and 94 from the thickness T1 of the sealing plate 41*b* (the chamfering amount C2=the thickness T1−the thickness T3 (see FIG. 12). The thickness T3 is the thickness of the sealing plate 41*b* at the edge of the short side portion 94 in FIG. 12. In this embodiment, the chamfering amount C1 of the long side portions 91 and 92 and the chamfering amount C2 of the short side portions 93 and 94 may be defined by chamfer dimensions.

In this embodiment, the ratio (C1/C2) of the chamfering amount C1 of the long side portions 91 and 92 to the chamfering amount C2 of the short side portions 93 and 94 is set in the range from 1/6 to 2/3 (preferably from 1/4 to 1/2).

In this embodiment, the ratio (C1/T1) of the chamfering amount C1 to the thickness T1 is, for example, set in the range from 1/8 to 1/4. The ratio (C2/T1) of the chamfering amount C2 to the thickness T1 is, for example, set in the range from 1/6 to 1/3. In one preferred aspect, when the thickness T1 is 1 mm to 2 mm, the chamfering amount C1 is greater than 0 and less than 0.3 mm, and the chamfering amount C2 is 0.2 mm to 0.5 mm.

Figure 13:
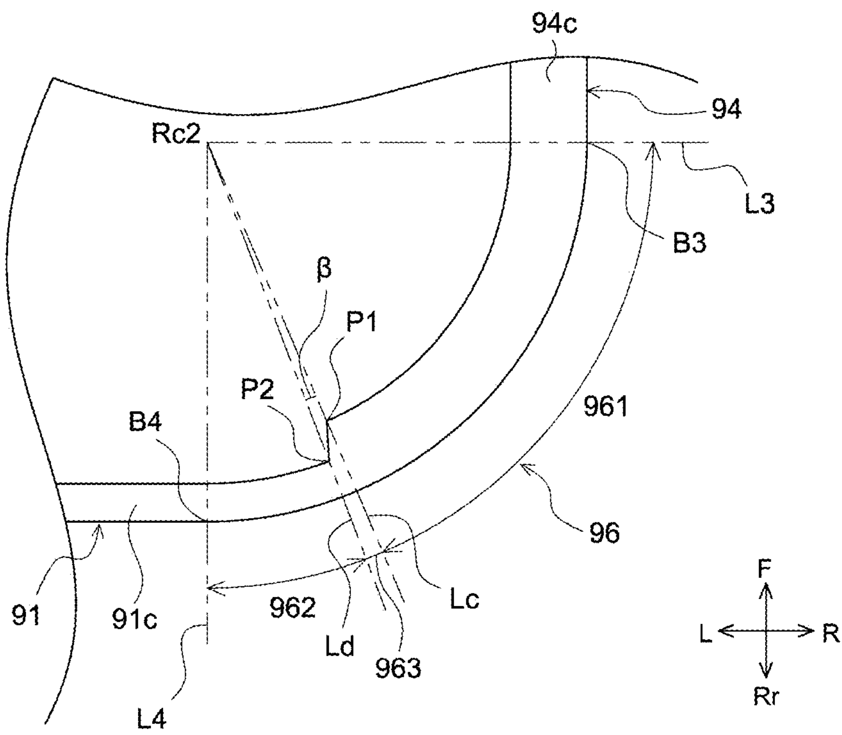
FIG. 13 is a partially enlarged view of FIG. 10.

FIG. 13 is a partially enlarged view of FIG. 10. FIG. 13 shows a partially enlarged portion in the vicinity of the R portion 96 of FIG. 10. As shown in FIG. 13, the R portion 96 is provided with a gradual change region 963. In the gradual change region 963, the chamfering amount gradually decreases from the first end P1 on the short side portion 94 side toward the second end P2 on the long side portion 91 side.

In this embodiment, the gradual change region 963 is provided in the range from 45° or more and less than 90° from the center Rc2 of the R portion 96, starting from the boundary B3 between the R portion 96 and the short side portion 94. As shown in FIG. 13, when the straight line L3 connecting the center Rc2 and the boundary B3 is set as a reference (0°), the gradual change region 963 may be located in the range from 45° or more and less than 90° (e.g., 50° to 70°) from the straight line L3 with the center Rc2 as the center. In FIG. 13, the gradual change region 963 is a portion sandwiched between straight lines Lc and Ld. Although not particularly limited thereto, the angle β formed between the straight lines Lc and Ls may be set to, for example, 3° to 10°.

In the form shown in FIG. 13, the R portion 96 has a first region 961, a second region 962, and a gradual change region 963. The first region 961 is a region adjacent to the short side portion 94. In FIG. 13, the first region 961 is a region sandwiched between the straight lines L3 and Lc. The second region 962 is a region adjacent to the long side portion 91. In FIG. 13, the second region 962 is a region sandwiched between the straight lines Ld and L4. The straight line L4 is a straight line connecting the center Rc2 and the boundary B4 between the R portion 96 and the long side portion 91. In the form shown in FIG. 13, the gradual change region 963 is provided between the first region 961 and the second region 962.

In this embodiment, the chamfering amount of the first region 961 is equal to the chamfering amount of the short side portion 94. The chamfering amount of the second region 962 is equal to the chamfering amount of the long side portion 91. In this case, as shown in FIG. 13, the first region 961 and the second chamfer 94*c* suitably have second chamfers 94*c*. The second region 962 and the long side portion 91 suitably have first chamfers 91*c*.

In the gradual change region 963, the chamfering amount of the first region 961 may change to gradually approach the chamfering amount of the second region 962 toward the second region 962 along the R portion 96. For example, the chamfering amount gradually decreases from the endpoint (the first end P1 in FIG. 13) of the first region 961 toward the starting point (the second end P2 in FIG. 13) of the second region 962.

Figure 14:
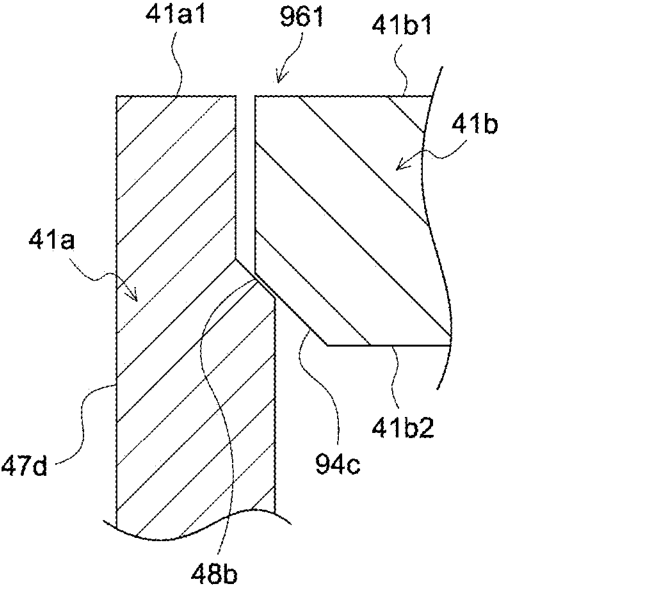
FIG. 14 is a sectional view of a first region 961 attached to an opening 41*a*1.
Figure 15:
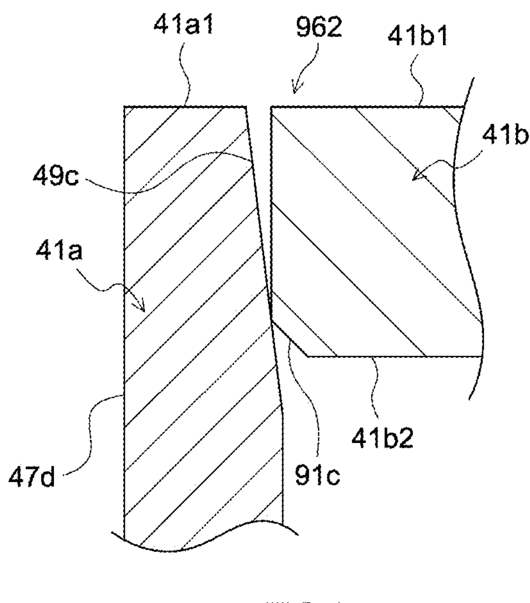
FIG. 15 is a sectional view of a second region 962 attached to the opening 41*a*1.

FIG. 14 is a sectional view of a first region 961 attached to an opening 41*a*1. FIG. 15 is a sectional view of a second region 962 attached to the opening 41*a*1. As shown in FIGS. 2, 9, 14, and 15, when the sealing plate 41*b* is attached to the opening 41*a*1 of the case body 41*a*, the R portion 96 is superimposed on the curved portion 47*d*. As shown in FIG. 14, the second chamfer 94*c* is superimposed on the step 48*b* (here, a first section of the curved portion 47*d*). As shown in FIG. 15, the first chamfer 91*c* is fitted into a portion (here, a second section of the curved portion 47*d*) where the tapered surface 49*c* is formed in the curved portion 47*d*.

In the battery case 41 disclosed herein, the steps 48*a* and 48*b* protruding inward are provided in the inner surfaces of the short sides 45*a* and 46*a* of the opening 41*a*1 in the case body 41*a*. The edge of the lower surface 41*b*2 of the sealing plate 41*b* is chamfered. The chamfering amount C2 of the short side portions 93 and 94 is greater than the chamfering amount C1 of the long side portions 91 and 92. As mentioned above, when the sealing plate 41*b* is attached to the opening 41*a*1, the long sides 43*a* and 44*a* of the opening 41*a*1 are superimposed on the long side portions 91 and 92, which is then clamped. Thus, by making the chamfering amount C1 of the long side portions 91 and 92 smaller, the fitting to the long sides 43*a* and 44*a* can be improved. Further, in the battery case 41, the R portions 95 to 98 are each provided with a gradual change region where the chamfering amount gradually decreases from the first end P1 on the short side portion 94 side toward the second end P2 on the long side portion 91 side. In other words, in the battery case 41, R portions 95 to 98 are each provided with a gradual change region, so that the chamfering amount of the short side portions 93 and 94 gradually approaches the chamfering amount of the long side portions 91 and 92. In this case, the chamfering amount of the short side portions 93 and 94 gradually decreases toward the long side portions 91 and 92. This can make it difficult for a gap to be formed between the case body 41*a* and the sealing plate 41*b* in the R portions 95 to 98. In particular, the clamping can suitably reduce formation of the gap in an area where a pressure is relatively difficult to be applied (e.g., an area in the vicinity of the boundaries between the R portions 95 to 98 and the long side portions 91 and 92). In addition, this can make it easier for a molten pool to be formed, so that welding between the case body 41*a* and the sealing plate 41*b* can be realized more suitably.

In this embodiment, the gradual change region 963 is provided in the range from 45° and more and less than 90° from the center Rc2, starting from the boundary B3 between the R portion 96 and the short side portion 94. When the sealing plate 41*b* is attached to the opening 41*a*1, the gradual change region 963 and a region where the chamfering amount is smaller than that of the short side portion 94 can be formed in a region where a gap is lively to be generated between the sealing plate 41*b* and the opening 41*a*1. This can allow the effect of preventing formation of the gap to be exhibited more suitably.

In this embodiment, the gradual change region 963 of the R portion 96 is provided between the first region 961 and the second region 962. Further, the chamfering amount of the first region 961 is equal to the chamfering amount of the short side portion 94, and the chamfering amount of the second region 962 is equal to the chamfering amount of the long side portion 91. In the R portion 96, the chamfering amount of a region (second region 962) adjacent to the long side portion 91 can be smaller. This can allow the effect of preventing formation of the gap to be exhibited more suitably.

The secondary battery 10 includes a battery case 41. In the battery case 41, as mentioned above, welding between the case body 41*a* and the sealing plate 41*b* substantially prevents formation of the gap between the case body 41*a* and the sealing plate 41*b* attached to each other. Thus, in the secondary battery 10 including the battery case 41, sealing is achieved more suitably.

In the case body 41*a*, the curved portions 47*a* to 47*d* are each provided with a gradual change section where the shape of the step 48*a*, 48*b* changes to be gradually close to the shape of the inner surface of the long side 43*a*, 44*a*. In other words, in the battery case 41, the curved portions 47*a* to 47*d* are provided with gradual change sections so that the shapes of the steps 48*a* and 48*b* of the short sides 45*a* and 46*a* become gradually close to the shapes of the inner surfaces of the long sides 43*a* and 44*a*. In this case, when the sealing plate 41*b* is attached to the opening 41*a*1 of the case body 41*a*, portions in contact with the sealing plate 41*b* are generated in the gradual change sections of the curved portions 47*a* to 47*d* of the opening 41*a*1 of the case body 41*a*, and the sealing plate 41*b* can be lightly press-fitted into the opening 41*a*1 of the case body 41*a*. This can make it difficult for the sealing plate 41*b* to slide out of place and easier to attach the sealing plate 41*b* to the opening 41*a*1 of the case body 41*a* when the sealing plate 41*b* is attached to the opening 41*a*1 of the case body 41*a*. Further, the gradual change sections provided in the curved portions 47*a* to 47*d* can allow for structural light press-fitting. Thus, the dimensional accuracy of the opening 41*a*1 of the case body 41*a* and the sealing plate 41*b* can be relaxed, and light press-fitting can be achieved within the range of dimensional error. This facilitates dimensional control of the sealing plate 41*b* and the case body 41*a*. Accordingly, operability is improved when the sealing plate 41*b* is attached to the opening 41*a*1 of the case body 41*a*. Further, the gap generated between the opening 41*a*1 of the case body 41*a* and the sealing plate 41*b* becomes smaller, making it difficult for the laser to escape.

The inner surface of the long side 44*a* is a tapered surface 49*c*. When the inner surface of the long side 44*a* is a tapered surface 49*c*, the inner surface of a portion of the long side 44*a* adjacent to the curved portion 47*c* may be a tapered surface. Therefore, light press-fitting can be achieved in the portion adjacent to the curved portion 47*c* in addition to the gradual change section 47*c*3. When the sealing plate is attached to the opening 41*a*1 with such a configuration, a gap is formed between the portion where the tapered surface 49*c* is formed and the sealing plate 41*b*. Such a gap can make it easier for the sealing plate 41*b* to be lightly press-fitted. Therefore, the configuration can allow the effect of improving the operability to be achieved more suitably, and the dimensional control to be conducted more easily.

The gradual change portion 47*c*3 is provided in the range from 45° or more and less than 90° from the center Rc1, starting from the boundary B1 between the curved portion 47*c* and the short side 46*a*. When the sealing plate 41*b* is attached, the gradual change section 47*c*3 can be formed in a region which is difficult to be dimensionally controlled. Thus, light press-fitting is achieved in the section, and the operability can be achieved more effectively. In addition, the step 48*b* can be provided in the range of at least less than 45° from the center Rc1, making it easier to support the sealing plate 41*b*.

Although embodiments of the technology disclosed herein have been described in detail above, they are mere examples and do not limit the appended claims. The technology described in the appended claims includes various modifications and changes of the foregoing specific examples. The following describes other embodiments of the technology disclosed herein. The matters other than those mentioned in the following embodiment are the same as those described in the above embodiment; thus, duplicated explanations are omitted.

Second Embodiment

In the first embodiment, the inner surfaces of the long sides 43*a* and 44*a* are each a tapered surface 49*c*. However, the present disclosure is not limited thereto. For example, the inner surfaces of the long sides 43*a* and 44*a* may each be a flat surface without any step or tapered portion except for the area in the vicinity of the boundaries with the curved portions 47*a* to 47*d*. In this case, for example, the second section 47*c*2 of the curved portion 47*c* and the portion in the vicinity of the curved portion 47*c* shown in FIG. 5 may each be provided with the tapered surface 49*c*. In this embodiment, the clamping substantially prevents formation of the gap in a portion where pressure is relatively difficult to be applied. Thus, when the sealing plate 41*b* is attached to the opening 41*a*1, formation of the gap between the sealing plate 41*b* and the opening 41*a*1 is substantially prevented. The portions in the vicinity of the curved portions 47*a* to 47*d* in the long sides 43*a* and 44*a* refer to, for example, portions from 1% to 5% of the lengths of the long sides 43*a* and 44*a* at both ends of the long sides 43*a* and 44*a*.

Third Embodiment

In the first embodiment, the edge of the lower surface 41*b*2 of the sealing plate 41*b* is chamfered. However, the present disclosure is not limited thereto. In the edge of the lower surface 41*b*2 may be rounded. Alternatively, the chamfering angle of the edge of the lower surface 41*b*2 may be set at 30° to 60° (e.g., 40° to 55°).

What is claimed is:

1. A battery case comprising:

a case body in bottomed rectangular parallelopiped shape having an opening in one side surface facing a bottom surface; and a substantially rectangular sealing plate attached to the opening and having a shape corresponding to an upper edge of the opening, wherein the opening of the case body comprises steps protruding inward, on inner surfaces of a pair of short sides facing each other, the sealing plate which is a plate fitted into the opening comprises:

a pair of long side portions facing each other;

a pair of short side portions located at both ends of the pair of long side portions and facing each other; and R portions provided at four corners between the long side portions and the short side portions, an edge of a lower surface of the sealing plate is chamfered, a chamfering amount of the pair of short side portions is greater than a chamfering amount of the pair of long side portions, each the R portions comprises a first region adjacent to one of the short side portions, a second region adjacent to one of the long side portions, and a gradual change region, in the gradual change region, a chamfering amount gradually decreases from a first end on a side of the short side portions toward a second end on a side of the long side portions, the gradual change region is provided between the first region and the second region, a chamfering amount of the first region is equal to the chamfering amount of the short side portions, a chamfering amount of the second region is equal to the chamfering amount of the long side portions, the first end is an endpoint of the first region, and the second end is a starting point of the second region.

2. The battery case according to claim 1, wherein when a straight line L3 connecting a center of the R portions and a boundary B3 between the R portion and the short side portion is set as a reference (0°), the gradual change region is located in a range from 45° or more and less than 90° from the straight line L3, the gradual change region is sandwiched between a straight line Lc and a straight line Ld in the R portion, and an angle between the straight line Lc and the straight line Ld is 3° to 10°.

3. A secondary battery comprising the battery case according to claim 1.

4. The battery case according to claim 2, wherein the first region is a region sandwiched between the straight line L3 and the straight line Lc, the second region is a region sandwiched between the straight line Ld and a straight line L4, and the straight line L4 is a straight line connecting the center of the R portion and a boundary B4 between the R portion and the long side portion.

5. The battery case according to claim 1, wherein the pair of short side portions on the lower surface of the sealing plate is put on the steps on the opening of the case body.

6. The battery case according to claim 1, wherein the opening of the case body comprises a pair of long sides facing each other, a pair of short sides facing each other, and four curved portions, each of the curved portions comprises:

a first section adjacent to one of the short sides;

a second section adjacent to one of the long sides; and a gradual change section between the first section and the second section, the first section is provided with the step, the second section is provided with a tapered surface, in the gradual change section, a shape of the step in the first section changes to be gradually close to the tapered surface from the second section along the curved portion, the first section overlaps the first region of the sealing plate, the second section overlaps the second region of the sealing plate, and the gradual change section overlaps the gradual change region of the sealing plate.

7. The battery case according to claim 6, wherein the gradual change section comprises a first tapered surface and a second tapered surface, a shape of the first tapered surface and a shape of the second tapered surface gradually change from the first section toward the second section, so that the first section and the second section are continuous, the first tapered surface gradually increases in size from an endpoint of the first section toward a starting point of the second section, and the second tapered surface gradually decreases in size from the endpoint of the first section toward the starting point of the second section.

8. A battery case comprising:

a case body in bottomed rectangular parallelopiped shape having an opening in one side surface facing a bottom surface; and a substantially rectangular sealing plate attached to the opening and having a shape corresponding to an upper edge of the opening, wherein the opening of the case body comprises steps protruding inward, on inner surfaces of a pair of short sides facing each other, the sealing plate which is a plate fitted into the opening comprises:

a pair of long side portions facing each other;

a pair of short side portions located at both ends of the pair of long side portions and facing each other; and R portions provided at four corners between the long side portions and the short side portions, an edge of a lower surface of the sealing plate is chamfered, a chamfering amount of the pair of short side portions is greater than a chamfering amount of the pair of long side portions, each the R portions comprises a first region adjacent to one of the short side portions, a second region adjacent to one of the long side portions, and a gradual change region, in the gradual change region, a chamfering amount gradually decreases from a first end on a side of the short side portions toward a second end on a side of the long side portions, the gradual change region is provided between the first region and the second region, a chamfering amount of the first region is equal to the chamfering amount of the short side portions, a chamfering amount of the second region is equal to the chamfering amount of the long side portions, the first end is an endpoint of the first region, the second end is a starting point of the second region, the opening of the case body comprises a pair of long sides facing each other, a pair of short sides facing each other, and four curved portions, each of the curved portions comprises:

a first section adjacent to one of the short sides;

a second section adjacent to one of the long sides; and a gradual change section between the first section and the second section, the first section is provided with the step, the second section is provided with a tapered surface, in the gradual change section, a shape of the step in the first section changes to be gradually close to the tapered surface from the second section along the curved portion, the first section overlaps the first region of the sealing plate, the second section overlaps the second region of the sealing plate, and the gradual change section is overlaps on the gradual change region of the sealing plate.

9. The battery case according to claim 8, wherein the gradual change section comprises a first tapered surface and a second tapered surface, a shape of the first tapered surface and a shape of the second tapered surface gradually change from the first section toward the second section, so that the first section and the second section are continuous, the first tapered surface gradually increases in size from an endpoint of the first section toward a starting point of the second section, and the second tapered surface gradually decreases in size from the endpoint of the first section toward the starting point of the second section.

* * * * *